Patented Nov. 15, 1932

1,887,757

UNITED STATES PATENT OFFICE

ERNEST F. GRETHER, OF MIDLAND, MICHIGAN, ASSIGNOR TO THE DOW CHEMICAL COMPANY, OF MIDLAND, MICHIGAN, A CORPORATION OF MICHIGAN

ALKYL ETHER OF HALOGENATED PARA-HYDROXYDIPHENYLS

No Drawing. Original application filed October 11, 1928, Serial No. 311,976. Divided and this application filed December 6, 1929. Serial No. 412,292.

In the well known process of the manufacture of phenol, wherein chlorbenzene is hydrolyzed with caustic soda solution under pressure at a temperature of 350° to 390° C., about five per cent. of tarry residue is obtained from the purification still. Such residue has been found to contain a high proportion of 4-hydroxy-diphenyl, or para-phenylphenol, together with a lesser amount of the isomeric ortho-compound. The aforesaid hydroxy-diphenyl compounds have hitherto been prepared only in the laboratory and with much difficulty, so have remained merely chemical curiosities without practical significance.

In a previous application, Serial No. 311,976, filed October 11, 1928 now Patent No. 1,832,484, of which this is a division, I have described new and useful derivatives of 4-hydroxy-diphenyl and specifically claimed chloro-hydroxy-diphenyls. In the present application, I shall claim certain other new and useful compounds derived from the above mentioned 4-hydroxy-diphenyl, particularly the alkoxy halogenated derivatives, as well as useful and novel methods for the preparation thereof.

To the accomplishment of the foregoing and related ends, the invention, then, consists of the methods and products hereinafter fully described and particularly pointed out in the claims, such methods and products, however, constituting but several of the ways and products respectively in which the principle of the invention may be exemplified.

I have found that the aforesaid 4-hydroxy-diphenyl may be halogenated under suitably controlled conditions whereby the mono-, di- or higher halogenated derivatives are obtained. I am aware that bromo derivatives have previously been prepared, as well as certain nitro and amino derivatives. However, none of the chlor-derivatives have been described in the literature.

I have further found that the alkyl ethers of the above mentioned halo derivatives of 4-hydroxy-diphenyl may be prepared by treating with alkylating agents in the usual way, for instance by reacting such with either a dialkyl sulfate or an alkyl halide.

Representative compounds of the several types in question, as well as suitable methods for the preparation thereof, are described in the following examples:—

1. 3-chlor-4-hydroxy-diphenyl.

One mole 4-hydroxy-diphenyl is dissolved in one mole caustic soda and six liters water, the solution cooled and a solution containing one mole sodium hypochlorite added slowly with constant stirring. The reaction mixture is allowed to stand for about one hour, then warmed to about 40° C., filtered, and, after cooling, the 3-chlor compound precipitated from the filtrate with hydrochloric acid. Fine colorless crystals, M. P. 77° C.

2. 3-chlor-4-methoxy-diphenyl.

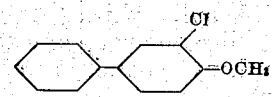

An alkaline solution of the preceding compound is treated with one and one-eighth mole methyl sulphate, with stirring. The methyl ether precipitates out. To complete the reaction the mixture is warmed to 50° to 60° C. for about one-half hour, then cooled and the crystals filtered off. Fine colorless crystals, M. P. 91° to 92° C.

3. 3-brom-4-methoxy-diphenyl.

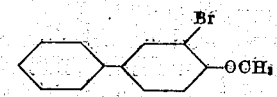

Formed by similar method to (1) and (2). Fine colorless crystals, M. P. 61° to 63° C.

The foregoing specific examples are merely illustrative of certain convenient methods of procedure for the preparation of the general classes of compounds herein referred to. While in some of the examples the formation of a methyl ether is described, it is equally feasible to prepare an ethyl or other alkyl ether by the use of an appropriate alkylating agent. Furthermore, I do not limit myself to the specific reagents as stated in the examples, for other related compounds in certain cases are adapted to the type of reaction in question and may be used, if desired, to prepare products of the above general description. For example, instead of sodium hypochlorite as chlorinating agent, I may use calcium, or other hypochlorite, or chlorine gas. For the formation of a mono-chlor derivative, a hypochlorite solution is to be preferred, whereas with chlorine directly the tendency is toward the production of di- or higher chlorinated derivatives. Likewise brominated derivatives may be made by employing the corresponding brominating agents. While methyl sulphate is specifically referred to in the example, I may use other methylating, or alkylating agents, such as a methyl or alkyl halide. It is also evident that, in some cases at least, the sequence of operations may be varied without change in the end-product obtained.

Other modes of applying the principle of the invention may be employed instead of the one explained, change being made as regards the method herein disclosed, provided the step or steps and ingredients stated by any of the following claims, or the equivalent of such be employed.

I therefore particularly point out and distinctly claim as my invention:—

1. The method of making a derivative of 4-hydroxy-diphenyl, which comprises alkylating the hydroxyl group of a halogenated 4-hydroxy-diphenyl containing at least one halogen group.

2. The method of making a derivative of 4-hydroxy-diphenyl, which comprises alkylating the hydroxyl group of a chlorinated 4-hydroxy-diphenyl containing at least one chlorine group.

3. The method of making 3.4-chloro-alkoxy-diphenyl, which comprises alkylating 3.4-chloro-hydroxy-diphenyl.

4. The method of making 3.4-chloro-methoxy-diphenyl, which comprises methylating 3.4-chloro-hydroxy-diphenyl.

5. As a new product, an alkyl ether of 3.4-halo-hydroxy-diphenyl.

6. As a new product, an alkyl ether of 3.4-chloro-hydroxy-diphenyl.

7. As a new product, 3.4-chloro-methoxy-diphenyl having a melting point of about 91° to 92° C., and being obtainable in colorless crystals.

8. As a new product, 3.4-bromo-methoxy-diphenyl having a melting point of about 61° to 63° C.

Signed by me this 29th day of November, 1929.

ERNEST F. GRETHER.